United States Patent [19]
Takeda et al.

[11] Patent Number: 4,808,987
[45] Date of Patent: Feb. 28, 1989

[54] IMAGE DATA FILE STORAGE AND RETRIEVAL SYSTEM FOR AN IMAGE DATA FILING SYSTEM

[75] Inventors: Haruo Takeda, Kawasaki; Kuniaki Tabata, Tokyo; Masao Nakamura, Hadano, all of Japan

[73] Assignee: Hitachi, Ltd., Tokyo, Japan

[21] Appl. No.: 682,939

[22] Filed: Dec. 18, 1984

[30] Foreign Application Priority Data

Dec. 21, 1983 [JP] Japan ............... 58-239759

[51] Int. Cl.⁴ ............................................. G09G 1/00
[52] U.S. Cl. ...................................... 340/721; 340/731; 340/723
[58] Field of Search ............... 340/710, 721, 724, 723, 340/725, 726, 731, 747, 748, 727, 744, 750; 364/521, 523

[56] References Cited

U.S. PATENT DOCUMENTS

| Re. 30,666 | 7/1981 | Mitchell et al. | 434/307 |
| 4,109,938 | 8/1978 | Mitchell et al. | 283/43 |
| 4,197,590 | 4/1980 | Sukonick et al. | 340/726 |
| 4,317,114 | 2/1982 | Walker | 340/747 |
| 4,408,301 | 10/1983 | Iida . | |
| 4,410,958 | 10/1983 | Demke et al. | 340/721 |
| 4,417,239 | 11/1983 | Demke et al. | 340/721 |
| 4,532,605 | 7/1985 | Waller | 340/731 |
| 4,559,533 | 12/1985 | Bass et al. | 340/747 |
| 4,586,156 | 4/1986 | Kurata et al. | 340/731 |
| 4,649,380 | 3/1987 | Penna | 340/731 |

FOREIGN PATENT DOCUMENTS

0009378  9/1979  European Pat. Off. .

OTHER PUBLICATIONS

"Spatial Management of Data", by C. F. Herot, ACM Transactions on Database Systems, vol. 5, No. 4, Dec. 1980, pp. 493–514.
Williams, Gregg, "The Lisa Computer System", *BYTE*, Feb. 1983, pp. 33–50.
"Lisa Draw", Apple Computer, Inc., copyright 1983, 1984, pp. 138.

*Primary Examiner*—Gerald L. Brigance
*Assistant Examiner*—Jeffery A. Brier
*Attorney, Agent, or Firm*—Antonelli, Terry & Wands

[57] ABSTRACT

An image data file storing and retrieval system is disclosed. In registering an image, partial areas of the image are enlarged and/or reduced at an independent magnification for each partial area, the enlarged and/or reduced partial areas are combined to prepare an index image, and the image and the index image is stored. In retrieving the image, a desired image is retrieved based on a list of the index images.

12 Claims, 3 Drawing Sheets to # IMAGE DATA FILE STORAGE AND RETRIEVAL SYSTEM FOR AN IMAGE DATA FILING SYSTEM

BACKGROUND OF THE INVENTION

The present invention relates to an image data file storage and retrieval system for an image data filing system in which image data retrieval is performed by index images.

As a capacity of an image data file increases, an image data file storage and retrieval system having a high operability and a high efficiency is required. In order to meet such a requirement, many systems which use reduced images as index images have been proposed. See, for example, Japanese Patent Application Laid-Open No. 87660/83 and Japanese Patent Publication No. 8499/82. In these patents, when original images are stored, reduced images thereof are stored in a file as index images. In retrieving the image data, a desired image is selected from a list of the index images and then a corresponding original image is retrieved. This system needs less data to be transferred in retrieving the image and has a higher response due to interactive operation as compared to a sequential image retrieval system (a page after page retrieval system) but frequently has a problem of degradation of image quality due to reduction of the image.

For example, where a document image contains characters and graphic patterns, the characters cannot be read if a reduction factor is increased to a limit of recognition of the graphic patterns. Conversely, if the reduction factor is retained to a limit of recognition of the characters, the grahic patterns are not sufficiently reduced and an efficiency of data compaction is low. In the prior art image data file storage and retrieval system, since the reduction factor is determined independently from any data characteristic, an image quality of the index images is so poor that a desired image cannot be selected by the index images or even if the image quality of the index images is good a data compaction factor is low, and the system has a low response due to interactive operation and the capacity of the file is not reduced.

SUMMARY OF THE INVENTION

It is an object of the present invention to provide an image data file storage and retrieval system which resolves shortcomings in the prior art image data file storage and retrieval system and which has a capability to prepare index images at a high data compaction factor which have a sufficiently high image quality as keys for selection of a desired image.

In order to achieve the above object, in accordance with the present invention, an index image is composed for each of different partial areas of each image, by reducing or enlarging the image at a separate magnification.

DESCRIPTION OF THE PREFERRED EMBODIMENTS

Figure 1:
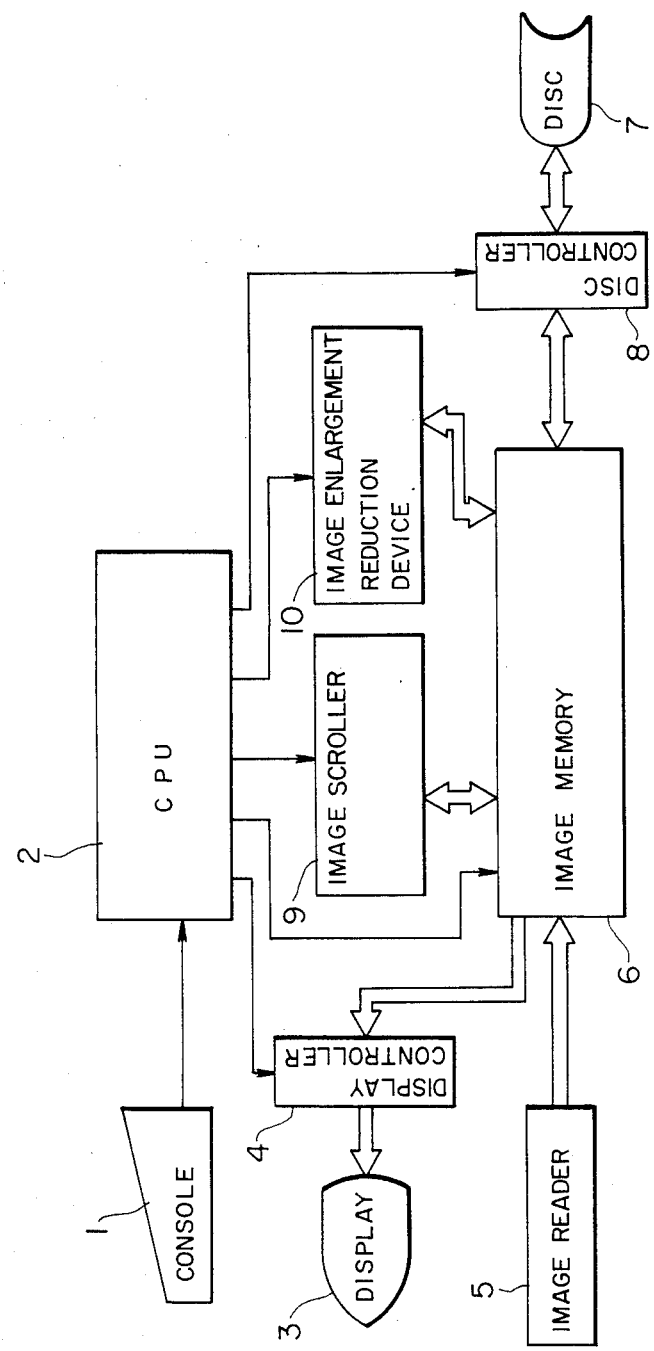
FIG. 1 is a block diagram of an image data file storage and retrieval system of the present invention.

FIG. 1 is a block diagram of a system in accordance with one embodiment of the present invention. Numeral 1 denotes a console, numeral 2 denotes a central processing unit, numeral 3 denotes a display, numeral 4 denotes a display controller, numeral 5 denotes an image reader, numeral 6 denotes an image memory, numeral 7 denotes a disc, numeral 8 denotes a disc controller, numeral 9 denotes an image scrolling device and numeral 10 denotes an image enlargement/reduction device. In the present embodiment, the disc 7 is used as an image file.

An image storage process is first explained. An image to be stored is entered by the image reader 5, and temporarily stored in the image memory 6 and also displayed on the image display 3. Command for preparing an index image are sequentially supplied from the console 1, and the central processing unit 1 interprets the commands and moves and/or reduces the input image to prepare the index image. The preparation of the index image is monitored through the display 3 so that the process is proceeded interactively, as will be explained later. Finally, commands for the storage are supplied from the console 1 and the central processing unit 2 interpretes the commands to store the index image and the original image in predetermined areas on the disc 7.

Figure 2:
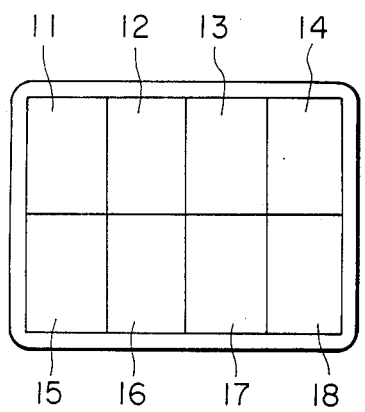
FIG. 2 shows a screen displayed in a retrieval mode in the present invention.

An image retrieval process is next explained. The index image are sequentially read from the disc 7, and stored in the image memory 6 and displayed on the display 3. When a desired index image is displayed, a select command is supplied from the console 1 and the central processing unit 2 interpretes the command to read out the corresponding image from the disc 7 into the image memory 6 and also displays it on the display 3. An example of display of the index image is shown in FIG. 2. Numerals 11-18 denote index image.

Figure 3:
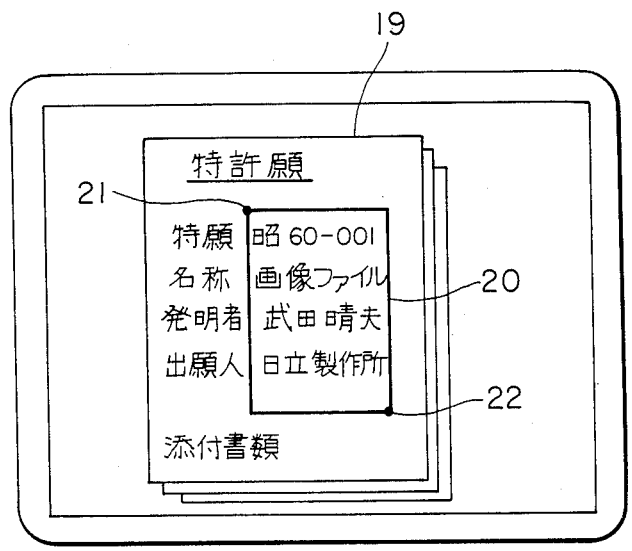
FIG. 3 shows a screen displayed in a storage mode in the present invention.
Figure 4:
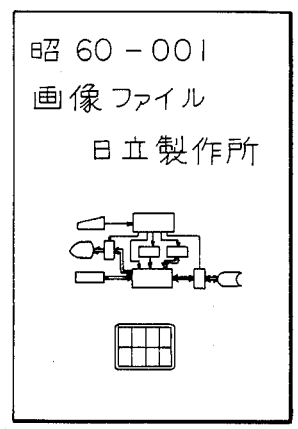
FIG. 4 shows an example of index image in the present invention.

Finally, an index image preparation process is explained in detail with reference to FIGS. 3 and 4. FIG. 3 shows a screen in a display operation for the preparation of the index image. Numeral 19 denotes an original image to be registered, which is, for example, a patent application form submitted to the Patent Office. The application form contains a title " 特許願 " (Application for Patent), " 所願号 60-001" (Patent Application No. 001/85), an inventor's name " 発明者 武田晴夫, " (Inventor Haruo Takeda), and an applicant's name " 出願人 日立製作所 " (Applicant Hitachi, Ltd.). Numeral 20 denotes a frame for indicating a size of the index image and numerals 21 and 22 denote two diagonal apexes indicating a position and a size one of partial area (rectangle) of the original image. Immediately after the start of the preparation of the index image, the original image 19 reduced into the area enclosed by the frame 20 is displayed. If the characters displayed are too small to be recognized, an operator depresses an enlarge key to enlarge the original image 19. As a result, the original image is enlarged beyond the frame 20 of the index image according to size of the contents of the input image 19. Accordingly, a partial area of the original image to be stored as the index image may go beyond the frame. In such a case, after the original image has been enlarged to such an extent that the characters can be recognized, the original image is scrolled by depressing a key so that the partial area to be stored comes into the frame 20. In this manner, one desired partial area is positioned in the frame 20, as shown in FIG. 3. The operator designates a left top point and a right bottom point of a partial area of the displayed image, for example, by a cursor and depresses a store key to store a partial image defined by those points as a portion of an index image. If any further partial image is to be stored to constitute the index image on the same page, similar operations are repeated to select and store such partial image as another portion of the index image. If the image consists of more than one page, a paging key is used for the purpose of selection of a partial image from another page so that one index image is comprised of a plurality of partial images extracted from different images. FIG. 4 shows an example of index image prepared by such an operation.

Figure 5:
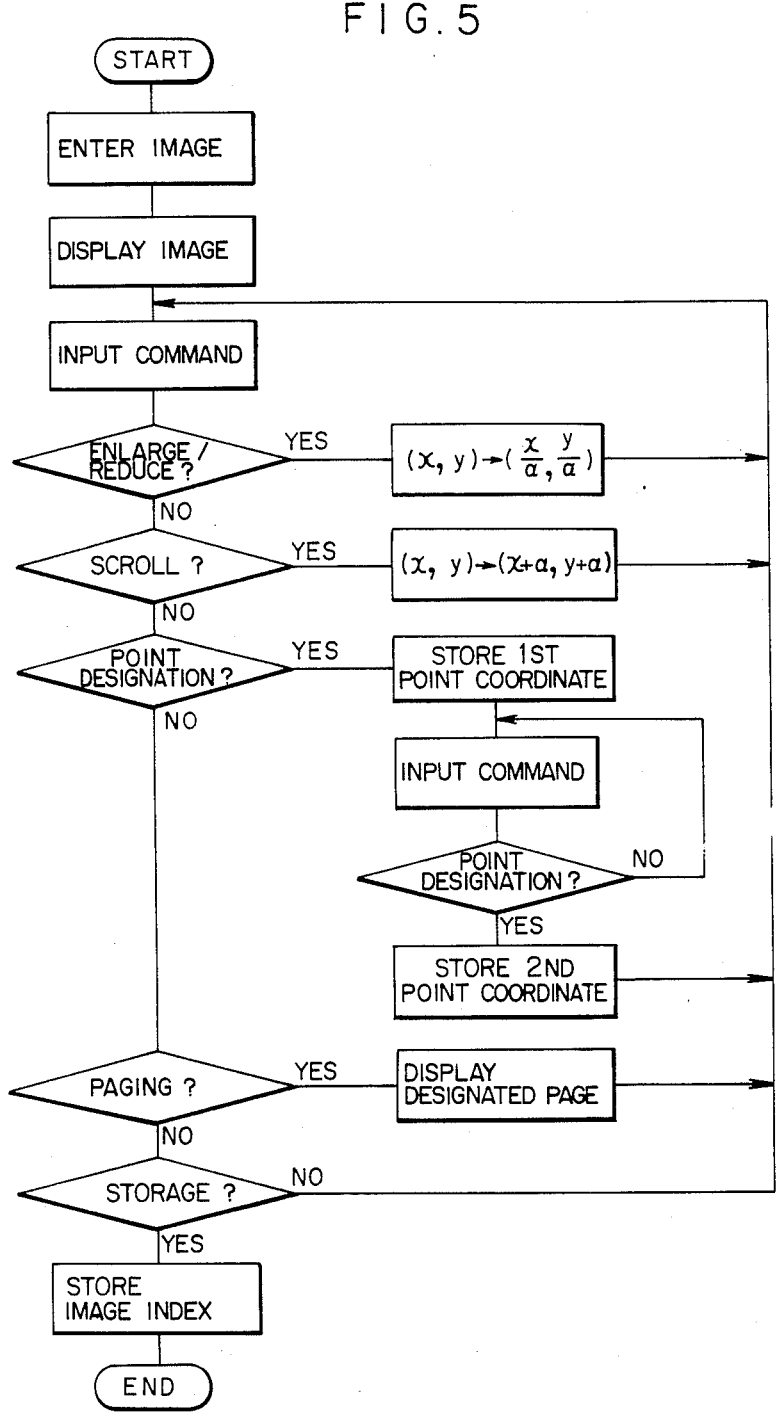
FIG. 5 is a flow chart showing a storage process of image indices in the present invention.

Referring to FIG. 5, a flow of the registration process of the index image is explained. After the image has been entered and displayed, a command is issued. Depending on the type of command, the enlargement/reduction, scroll, point designation, paging or registration of the index image step is carried out. In the enlargement/reduction step, a pixel at coordinates ($[x/\alpha]$, $[y/\alpha]$) is shifted to coordinates (x, y) in the image memory 6 for each point, where $\alpha$ is a magnification for the enlargement/reduction and symbol [ ] represents an integer after rounding of fractions of 0.5 and over as a next larger whole number. The enlargement or the reduction is designated by a parameter of the command. In the scrolling step, a pixel at coordinates ($x-\alpha$, y) or (x, $y-\alpha$) is moved to coordinates (x, y) in the image memory 6 for each point, where $\alpha$ is a unit of scrolling by one command. A direction of the scrolling is designated by a parameter of the command. In the point designation step, coordinates of two points designated by the cursor on the display 3 are temporarily stored in the CPU 2. In the paging step, an image other than the image currently being displayed is displayed where more than one image is entered and stored in the image memory 6. The above steps may be repeated any number of times and the coordinates of the points to be stored by the point designation are stored in different memory areas of the CPU 2 in each cycle. When storage command is issued in a case that the coordinates have been stored by the point designation, rectangular partial areas each having those points as two diagonal points are sequentially extracted from the image memory 6 and stored in a predetermined area on the disc 7 as an index image of a corresponding original image. In other cases, a partial image area corresponding to the frame 20, defined by an enlargement/reduction command and scrolling command, is extracted and stored in the predetermined area on the disc as the index image.

In the index image shown in FIG. 4, the application serial number appears in the first line and then the title of the invention and the applicant's name sequentially appear. A representative drawing of the invention and the image index are displayed thereunder. In the present example, the characters are reduced at a magnification which allows the characters to be read or recognized and the drawing is reduced at a larger magnification. Accordingly, the document selection is easier in the retrieval operation as compared with the document reduced at a uniform magnification. Further, the index image can be prepared by combining characteristic portions of more than one page of document as, for example, as disclosed in U.S. Pat. No. 4,408,301. An index image which is a mere reduction of the original image may also be stored, as was done in the prior art system.

In addition to the examples described above, a function to enlarge or reduce a list of the index images displayed in the retrieval operation may be added. The enlargement function is required to make watching of fine portions of the index image easier and the reduction function is required to allow simultaneous display of more index image to make comparison and selection easier. The enlargement/reduction function of the index images has been known. See, for example, "Spatial Management of Data" by C. F. Herot, ACM Transactions on Database Systems, Vol. 5, No. 4, December 1980, pages 493–514. In the present invention, there is provided a storage method for the index images which is effective to perform such a function. In the display screen shown in FIG. 3, a frame which is equal in size to an enlarged index image or a reduced index image in the retrieval mode is displayed in addition to the frame 20 and index images are displayed in those frames in accordance with the sizes of those frames. The image memory 20 may store the image and index image for permitting retrieving the image in a set. Thus, when the operator stores the index image, the operator can proceed with the process while watching the enlarged or reduced image as well as the normal size image which will appear in the retrieval mode. Thus, the operator can prepare a more appropriate index image.

The embodiment for interactively preparing the index images and retrieving the index images has been described. Instead of using the interactive method, the index images may be automatically prepared in a predetermined rule. The present invention may be implemented by a software in an existing system or by a hardware.

In accordance with the present invention, the enlargement/reduction and extraction/synthesization steps can be carried out interactively or by the predetermined rule to prepare the index images while the screen in the retrieval mode is watched. Accordingly, the index images having more information in a given capacity are available and a desired index image can be retrieved more simply in a shorter time.

We claim:

1. An image data file storage system comprising:
   image data file means for storing a plurality of images which are to be retrieved;
   image input means for inputting an image to be stored in said image data file means;
   image display means having a display screen for displaying the input image from said image input means;
   instruction means for specifying processing to be performed with respect to the input image displayed on said display screen;
   first means for changing at a designated magnification a whole size of the input image being displayed on said display screen to vary the magnification of an image inputted by the image input means according to the size of the image inputted by the input means; and
   second means for extracting at least a part of the displayed input image which has been changed in size by said first means and for storing said input image and said extracted image in said image data file means as one of said images to be retrieved and as an index image for retrieving said input image, a group of index images read out of said image data file means being displayed at one time on said display screen as index information for designating one of said images to be retrieved at the time of retrieving the image.

2. A system according to claim 1, wherein said instruction means includes means for instructing preparation of the index image, and when the preparation of the index image is instructed, said first means automatically performing a reduction operation to reduce a whole of the input image to a size to be accommodated in a predetermined frame area on said display screen for displaying the reduced input image, and the size of said displayed input image being further changed by said first means at a magnification designated by said instruction means on the basis of the size of said frame area.

3. A system according to claim 2 further comprising:
third means for scrolling the input image displayed on said display screen in a designated direction, and wherein
said second means extracts as said index image a partial image positioned within said frame area on said display screen.

4. A system according to claim 2, wherein said instruction means includes means for designating a partial area on said display screen, and said second means stores an image within said designated partial area, in said image data file means as said index image.

5. A system according to claim 4, wherein said second means stores in said image data file means partial images of two or more partial areas each occupying a different position in the input image displayed on said display screen so that said partial images constitute in combination therewith said index image for retrieving the input image.

6. An image data processing method used in an image data storage system which includes an image input device for inputting an image, a display unit for displaying the input image, a first device for changing a size of the input image on a display screen of said display unit, a second device for scrolling the input image on the display screen in a designated direction, an image file for storing the input image, and a data processing unit for extracting at least a part of an area of the input image displayed on the screen and for storing in said image file the part of the area of the input image as an index image which is displayed at the time of retrieval of said input image, said image data processing method comprising the steps:
inputting an image to be stored, by said image input device;

reducing the input image to a size so that a whole of the input image is located in a predetermined frame on said display screen, said predetermined frame having the same size as the index image, and outputting the reduced input image to said display unit;

enlarging the reduced and displayed input image to a size larger than said predetermined frame, and outputting the enlarged input image to said display unit;

extracting a desired partial area of said enlarged and displayed input image; and storing the image of the extracted partial area in said image file as the index image.

7. A method according to claim 6 further comprising the step:
scrolling the input image in a designated direction so that the image of said desired partial area to be extracted is accommodated in said frame on the display screen so that the image positioned in said frame becomes said index image.

8. A method according to claim 6 wherein said step of extracting a partial area is performed for different positions on said input image, and a plurality of extracted partial images are stored in said image file so as to form in combination therewith said index image.

9. A method according to claim 8, wherein said plurality of extracted partial images respectively have magnifications chosen according to the size of the contents of input original partial images.

10. An index image data file storage and retrieval system comprising:
image input means for inputting an image to be stored;
display means having a screen for displaying the inputted image;
means for changing a size of partial areas of the inputted image on the screen at a variable magnification;
storage means for storing the image and an index image for permitting retrieving the image in a set; and
means for writing in said storage means as said index image the reduced partial areas at an independent magnification for each partial area.

11. An index image data file storage and retrieval system according to claim 10 further comprising means for scrolling the partial areas or the screen in a desired direction.

12. An index image data file storage and retrieval system according to claim 10 wherein said means for extracting includes means for displaying a plurality of index images simultaneously on said display means at a time of retrieving the image.

* * * * *